US010803091B2

(12) United States Patent
Wei

(10) Patent No.: US 10,803,091 B2
(45) Date of Patent: Oct. 13, 2020

(54) METHOD AND DEVICE FOR DETERMINING A CATEGORY DIRECTORY, AND AN AUTOMATIC CLASSIFICATION METHOD AND DEVICE

(71) Applicant: Alibaba Group Holding Limited, Grand Cayman (KY)

(72) Inventor: Peng Wei, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 766 days.

(21) Appl. No.: 15/491,895

(22) Filed: Apr. 19, 2017

(65) Prior Publication Data

US 2017/0220669 A1 Aug. 3, 2017

Related U.S. Application Data

(63) Continuation of application No. PCT/CN2015/091687, filed on Oct. 10, 2015.

(30) Foreign Application Priority Data

Oct. 20, 2014 (CN) .......................... 2014 1 0557622

(51) Int. Cl.
*G06F 16/00* (2019.01)
*G06F 16/28* (2019.01)

(52) U.S. Cl.
CPC ............ *G06F 16/285* (2019.01); *G06F 16/00* (2019.01)

(58) Field of Classification Search
CPC combination set(s) only.
See application file for complete search history.

(56) References Cited

U.S. PATENT DOCUMENTS

| 7,966,329 B1 * | 6/2011 | Rukonic | G06Q 40/00 707/737 |
| 2003/0061122 A1 | 3/2003 | Berkowitz et al. | |
| 2009/0248671 A1 * | 10/2009 | Maruyama | G06F 16/353 |
| 2010/0332428 A1 | 12/2010 | McHenry et al. | |
| 2011/0087427 A1 * | 4/2011 | Liu | G01C 21/20 701/532 |

(Continued)

FOREIGN PATENT DOCUMENTS

| CN | 101147144 A | 3/2008 |
| CN | 101364239 | 2/2009 |
| CN | 102737057 | 2/2009 |

(Continued)

OTHER PUBLICATIONS

Translated Chinese Office Action from corresponding Chinese patent application No. 2014105576224, dated Jan. 10, 2017, 4 pages.

(Continued)

*Primary Examiner* — Khanh B Pham
(74) *Attorney, Agent, or Firm* — Lee & Hayes, P.C.

(57) ABSTRACT

Current disclosure discloses a method and device for determining a category directory, and an automatic classification method and device. A user change category message is received. A target change category item is generated based on the user change category message. Previous change category items are analyzed with respect to the target change category item to determine whether an existing category directory needs to be updated.

19 Claims, 6 Drawing Sheets

(56) References Cited

U.S. PATENT DOCUMENTS

2013/0046661 A1* 2/2013 Levin .................... G06Q 40/02
705/30

FOREIGN PATENT DOCUMENTS

| CN | 102456058 | 5/2012 |
| CN | 102456058 A | 5/2012 |
| EP | 2704066 A1 | 3/2014 |
| JP | 2003030221 A | 1/2003 |
| JP | 2008305268 A | 12/2008 |
| JP | 2009193597 A | 8/2009 |

OTHER PUBLICATIONS

Translated Chinese Search Report from corresponding Chinese patent application No. 2014105576224, dated Nov. 23, 2016, 1 page.

Extended European Search Report dated Jul. 10, 2018 for European patent application No. 15853071.7, 12 pages.

Translation of International Search Report from corresponding PCT application No. PCT/CN2015/091687 dated Jan. 8, 2016, 2 pages.

Translation of Written Opinion from corresponding PCT application No. PCT/CN2015/091687 dated Jan. 8, 1016, 6 pages.

Translation of Japanese Notice of Allowance from corresponding Japanese Patent Application No. 2017-521249, dated May 28, 2019, 6 pages.

Korean Office Action dated Jul. 8, 2019 for Korean Patent Application No. 2017-7010097, a counterpart of U.S. Appl. No. 15/491,895, 4 pages.

European Office Action dated Apr. 15, 2020 for European Patent Application No. 15853071.7, a counterpart of U.S. Appl. No. 15/491,895, 11 pages.

Singaporean Written Opinion dated May 8, 2020 for Singaporean Patent Application No. 10201903470V, a counterpart of U.S. Appl. No. 15/491,895, 6 pages.

\* cited by examiner

મethod AND DEVICE FOR
DETERMINING A CATEGORY DIRECTORY,
AND AN AUTOMATIC CLASSIFICATION
METHOD AND DEVICE

CROSS REFERENCE TO RELATED PATENT
DISCLOSURES

This application claims priority to and is a continuation of PCT Patent Application No. PCT/CN2015/091687, filed on 10 Oct. 2015, which claims priority to Chinese Patent Application No. 201410557622.4, filed on 20 Oct. 2014, entitled "a method and device for determining a category directory, and an automatic classification method and device," which are hereby incorporated by reference in their entirety.

TECHNICAL FIELD

The present disclosure relates to the technical field of computer processing, and in particular, to a method and device for determining a category directory, and an automatic classification method and device.

TECHNICAL BACKGROUND

In the technical field of computer processing, upon completing resource processing, a resource processing system usually generates a record which describes the resource processing process. Such resource processing record may generally include: user information, processing side information, amount of resources, resource processing time, etc. Such resource processing records may be classified into multiple categories to facilitate, e.g., statistical analysis of the records by users.

BRIEF DESCRIPTION OF THE DRAWINGS

To more clearly illustrate the technical solutions in the examples of the present disclosure and/or the existing technologies, the accompanying drawings are briefly described herein. Apparently, the accompanying drawings described herein merely represent some examples of the present disclosure, and one of ordinary skill in the art may further derive other drawings from these accompanying drawings without any creative effort.

DETAILED DESCRIPTION OF THE EXAMPLES

Figure 1:
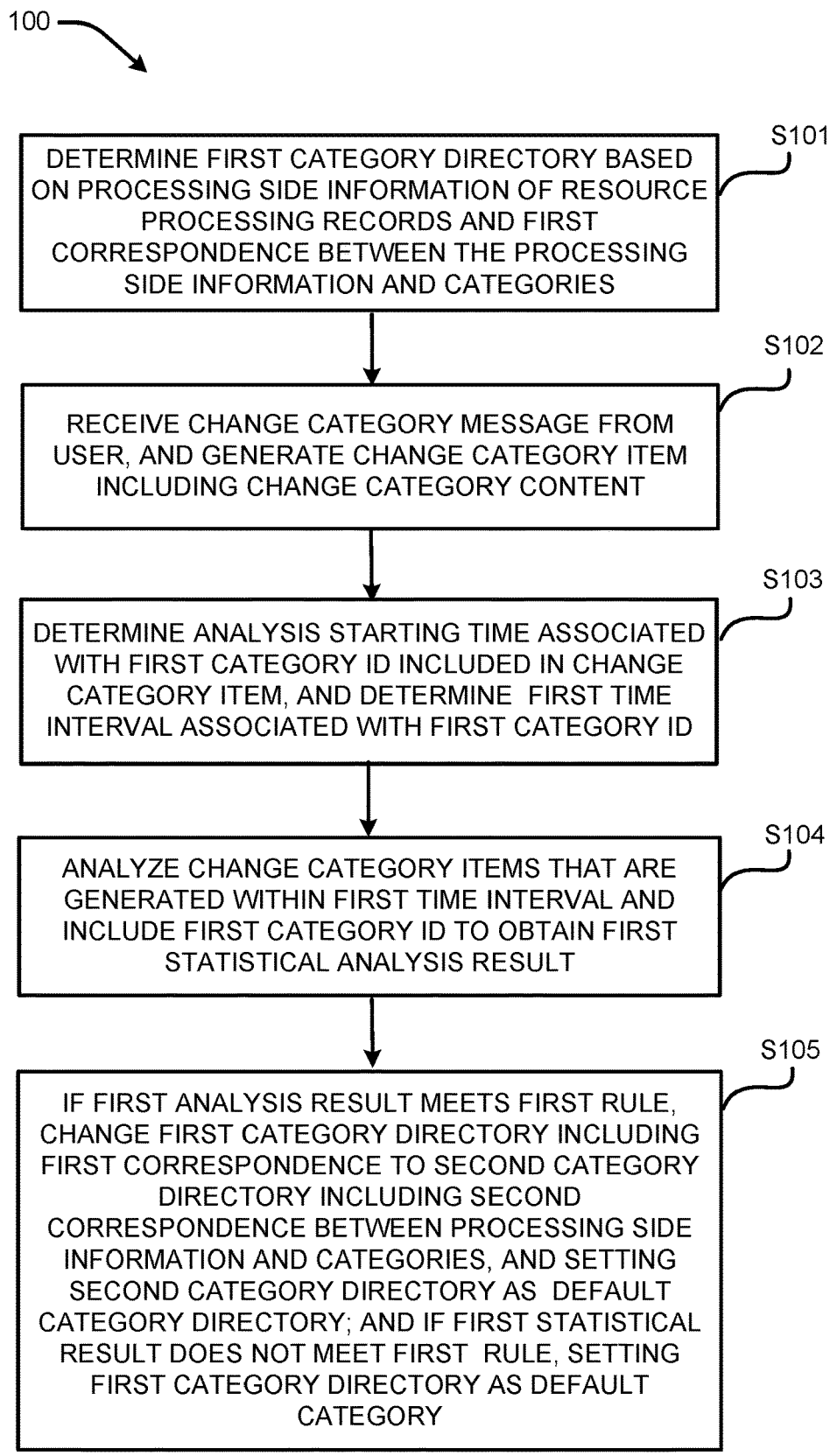
FIG. 1 illustrates a flow chart of an example of a method for determining a category directory.

Determining a category directory may include the following operations: using the processing side information in the resource processing records as category names in the category directory, grouping all records with the same processing side information into a same category under the category name, and the category directory includes all category names each for a category.

Some technical problems may be faced. For example, a resource processing system may include a plurality of subsystems, and accordingly, the processing side information contained in the resource processing records generated by the resource processing system may vary. As a consequence, resource processing records that are supposed to be classified into the same category may be actually classified into multiple different categories. That is, the generated category directory may not reflect an accurate classification result.

To overcome, among others, this technical problem, an improved accuracy in classifying resource processing records is needed. Examples of the current disclosure provide a method and a device for determining a category directory, and an automatic classification method and device.

A method for determining a category directory, comprising: determining a first category directory based on processing side information of resource processing records and a first correspondence between the processing side information and categories; receiving a change category message from a user, and generating a change category item including a change category content indicating the user changing a first category with a first category ID to a second category with a second category ID; determining a statistical starting time associated with the first category ID included in the change category item, and determining a first time interval associated with the first category ID; statistically analyzing change category items that are generated within the first time interval and include the first category ID to obtain a first statistical analysis result; if the first statistical analysis result meets a first rule, modifying the first category directory including the first correspondence to a second category directory including a second correspondence between the processing side information and categories, and setting the second category directory as a default category directory; and if the first statistical result does not meet the first rule, setting the first category directory as a default category directory.

An automatic classification method for classify resource processing records based on a category directory determined using the category directory determining method, comprising: receiving resource processing records from a user; classifying the resource processing records using a second correspondence between the processing side information and categories contained the default category directory to obtain a classification result; and returning the classification result to the user.

A category directory determination device, comprising: a first category directory determination unit, a change category item generation unit, a first time interval determination unit, a first statistical analysis unit and a default category directory determination unit. The first category directory determination unit is operable to determine a first category directory based on processing side information of resource processing records and a first correspondence between the processing side information and categories; the said change category item generation unit is operable to receive a change category message from a user, and to generate a change category item including a change category content indicating changing a first category with a first category ID to a second category with a second category ID; the first time interval determination unit is operable to determine a statistical starting time associated with the first category ID included in the change category item, and to determine a first time interval associated with the first category ID; the said first statistical analysis unit is operable to statistically analyze change category items that are generated within the first time interval and include the first category ID to obtain a first statistical analysis result; the default category directory determination unit is operable to, if the first statistical analysis result meets a first rule, change the first category directory including the first correspondence to a second category directory including a second correspondence between the processing side information and categories, and set the second category directory as a default category directory, and if the first statistical result does not meet the first rule, set the first category directory as a default category directory.

An automatic classification device, comprising: a receiving unit, a default category classification unit and a feedback unit; wherein the receiving unit is operable to receive resource processing records from a user; the default category classification unit is operable to classify the resource processing records using the second correspondence between processing side information and categories contained in the default category directory to obtain a classification result; and the feedback unit is operable to return the classification result to the user.

As illustrated by the technical solutions of the implementation examples, the disclosed methods and devices of determining a category directory analyze processing side information to determine a correspondence between the processing side information and categories. Therefore, similar resource processing records will correspond to a same category and the accuracy in the classification results is thus improved. At the meanwhile, user messages to change categories are received, and the existing category directory is updated based on the user change category messages so as to ensure that the determined category directory fits users' requirements and the accuracy of the classification results is thus further improved.

The automatic classification methods and devices classify resource processing records using the results obtained through the category directory determination methods and devices. The obtained classification results are in turn improved in accuracy. Further, the classification can be carried out according to the continuously updated category directory such that the classification result can better meet the classification requirements of the users.

The following detailed description of the technical solutions in the examples is provide to enable people in the relevant technical fields to better appreciate the technical solutions of the disclosure, with references made to the accompanying drawings that form a part thereof. Apparently, the examples described herein merely represent some, but not all, implementation examples of the present disclosure, and one of ordinary skill in the art may further derive other examples from these described examples without any creative efforts, any and all of which are included in the scope of the disclosure.

To accurately classify resource processing records, an accurate category directory is needed, which will lead to an accurate classification result.

1. Methods for Determining Category Directory

The following describes examples of a method for determining a category directory according to the disclosure.

FIG. 1 illustrates a flow chart 100 of an example of a method for determining a category directory according to the present disclosure. As shown in FIG. 1, example 100 of the category directory determination method may include:

S101: determine a first category directory based on processing side information of resource processing records and a first correspondence between the processing side information and categories.

The first category directory is determined based on processing side information of resource processing records and a first correspondence between the processing side information and categories. The processing side information may include, but is not limited to, resource processing system name, resource processing system characteristics, etc.

The first correspondence may be determined based on the processing party information.

The first correspondence may be determined based on the processing party associated with the processing side information and/or may be determined based on characteristics of the processing party associated with the processing side information.

For example, resource system A may include subsystems a1 and a2, then in the first correspondence, processing side information including contents of a1 or a2 all may correspond to a category named "A". For another example, resource system B and resource system C both relate to resource processing systems for transportations. In the first correspondence, processing side information including contents B or C all may correspond to a category named "transportation".

The first correspondence can also be determined based on keyword analysis of the processing side information. For an illustrative example, in the case that processing side information includes "songs of singer A", a key word analysis of the processing side information may show that the said "songs" and "singer A" all belong to the domain of music. Therefore, a correspondence may be established between the processing side information of "songs of singer A" and a category named "music".

In the first correspondence, one or more pieces of processing side information may correspond to a single category.

Based on the first correspondence between processing side information contained in the resource processing records and the categories, a first category directory may be determined. The first category directory may include category identification ("category ID") of one or more categories and the associated category names. The category directory may also include the first correspondence between the processing side information and the categories.

S102: receive a change category message from a user, and generate a change category item including a change category content.

A category directory determination device may receive a change category message from users. The change category message indicates changing a category of a resource processing record. Such change category message may include: user identification ("user ID"), processing side information contained in the resource processing record, change category time, the category ID before the change ("pre-change category ID") and the category ID after the change ("post-change category ID"). Such user change category message may be automatically generated upon a user modifying a category classification, and sent to the category directory determination device.

The category directory determination device may generate change category item based on the received change category message. The change category item may include: change category content, user ID and change category time.

The change category content may include: processing side information, pre-change category ID and post-change category ID.

S103: determine a statistical starting time associated with a first category ID included in the change category item, and determine a first time interval associated with the first category ID.

The category directory determination device may determine a statistical starting time associated with a first category ID included in the change category item. The first category ID may be one of the pre-change category IDs in the change category content.

The determination of the statistical starting time associated to the first category ID may include setting as the statistical starting time the immediately previous time point when the first category ID is modified in the relevant category directory where the first category ID belongs to.

The operation of determining the statistical starting time may be repeatedly performed with a first time interval. The first time interval may be input into the category directory determination device by a user.

A first time interval as associated with the first category ID may be determined based on the determined statistical starting time. Specifically, for example, the time period between the statistical starting time and the current time may be taken as the first time interval associated with the first category ID.

S104: statistically analyze change category items that are generated within the first time interval and include the first category ID to obtain a first statistical analysis result.

The category directory determination device may statistically analyze change category items that are generated within the first time interval and include the first category ID to obtain a first statistical analysis result. Specifically, for example, the statistical analysis may obtain a total number of first candidate change category items as a first total amount, the first candidate change category items each including a pre-change category ID same as the first category ID. A second total amount may be obtained as a total number of user ID types included in the first candidate change category items. The statistical analysis may also obtain a total number of second candidate change category items as a third total amount, the second candidate change category items each being among the first candidate change category items and further including a post-change category ID same as the second category ID. A fourth total amount may be obtained as a total number of user ID types included in the second candidate change category items. The second category ID is different than the first category ID.

The first statistical analysis result may include the first total amount, the second total amount, the third total amount, and the fourth total amount.

For an illustrative example, a first category ID may be "A" and a second category ID may be "B". The statistical analysis may identify all change category items that each includes pre-change category ID "A" as the first candidate change category items. The total number of the first candidate change category items is obtained as the first total amount. A total number of user ID types included in the first candidate change category items may be obtained as the second total amount. The statistical analysis may identify all the first candidate change category items that each includes a post-change category ID "B" as the second candidate change category items. The total number of the second candidate change category items may be obtained as the third total amount. A total number of user ID types included in the second candidate change category items may be obtained as the fourth total amount.

S105: if the first statistical analysis result meets a first rule, change the first category directory including the first correspondence to a second category directory including a second correspondence between the processing side information and the categories, and setting the second category directory as the default category directory; and if the first statistical result does not meet the first rule, setting the first category directory as the default category.

The first statistical analysis result may be compared with a first rule. The first rule may be used to determine whether the first category directory and the first correspondence need to be modified.

The first rule may include one or more of the following rules:

The first total amount in the first statistical analysis result is larger than or equal to a first threshold, the first threshold being smaller than or equal to a total number of change category items generated in the first time interval;

The second total amount in the first statistical analysis result is larger than or equal to a second threshold, the second threshold being smaller than or equal to a total number of user ID types in the change category items generated in the first time interval, and the second threshold being smaller than or equal to the first total amount;

The third total amount in the first statistical analysis result is larger than or equal to a third threshold, the third threshold being smaller than or equal to the first total amount; and The fourth total amount in the first statistical analysis result is larger than or equal to a fourth threshold, the fourth threshold being smaller than or equal to the third total amount.

If the first statistical analysis result meets the first rule, the first correspondence may be modified such that a processing side information which previously corresponds to the first category ID under the first correspondence now corresponds to the second category ID. Thus, a second correspondence is generated through the modification of the first correspondence. A second category directory may be generated based on the second correspondence. The second category directory may include one or more category IDs and the second correspondence between the one or category IDs and the processing side information. The second category directory may be set as the default category directory.

If the first statistical analysis result does not meet the first rule, the first category directory including the first correspondence will not be modified, and may be set as the default category directory.

The default category directory may be used as the finally determined category directory according to examples of the current disclosure.

In the above described example of a method for determining category directory, the correspondence between processing side information and categories is determined based on the analysis of the processing side information so that it is ensured that similar resource processing records be classified into the same category. Therefore, a category directory determined using the current method will lead to improved accuracy in the classification results. At the meanwhile, the existing category directory will be continuously updated based on received user change category messages, which ensures that the generated category directory fits user requirements. This in turn further improves the accuracy in the classification results.

Figure 2:
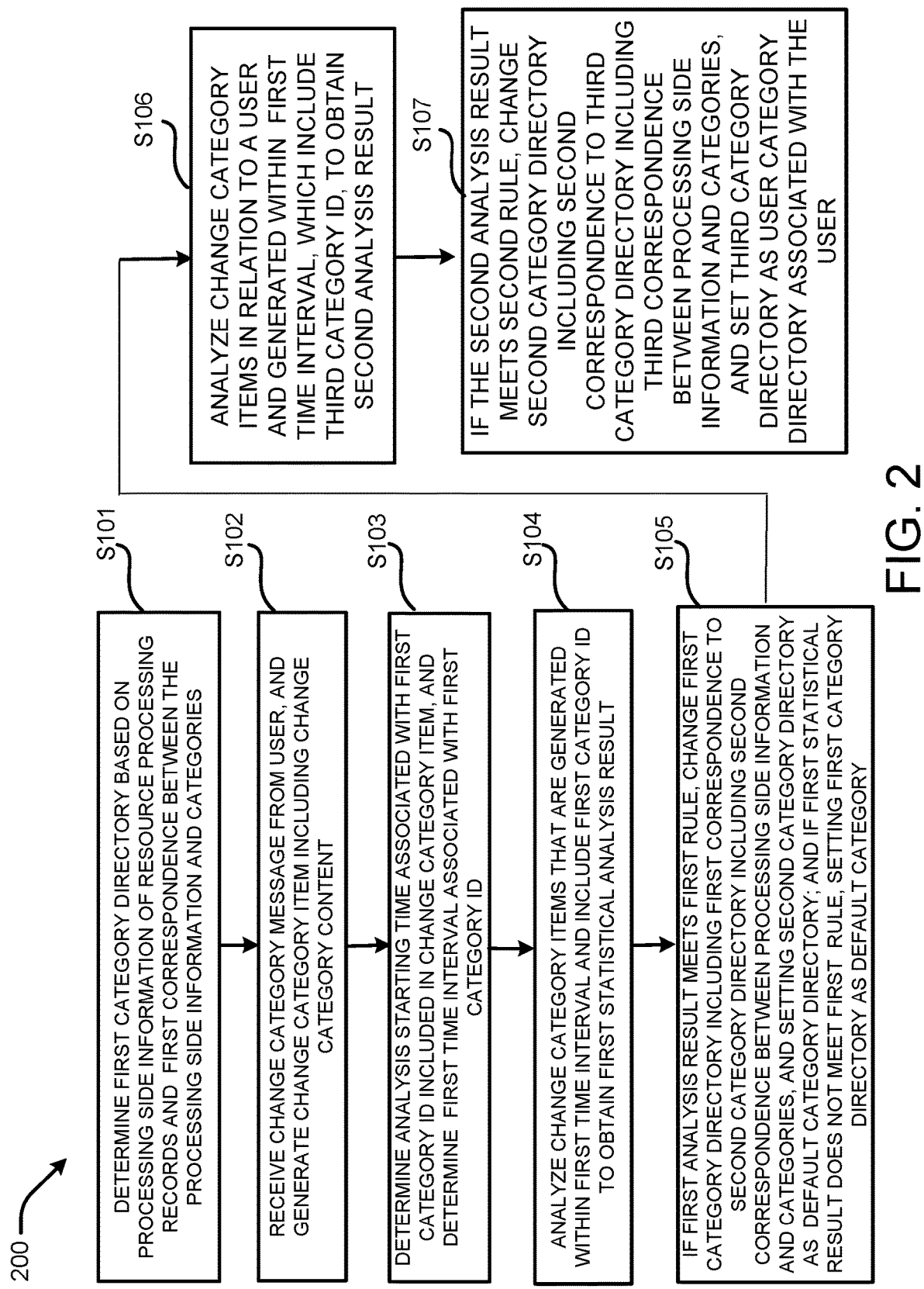
FIG. 2 illustrates a flow chart of another example of the method for determining a category directory.

With reference to FIG. 2, another example of a method of determining category directory is described. FIG. 2 illustrates an example flow diagram 200 of another example of method for determining a category directory. As shown in FIG. 2, compared to the example flow 100 shown in FIG. 1, the example flow 200 for determining a category directory further comprises the following operations.

S106: statistically analyze change category items in relation to a user and generated within the first time interval, which include a third category ID, to obtain a second statistical analysis result.

An individual user's change category items within the first time interval may be statistically analyzed to identify those which include a third category ID. A second statistical analysis result may be obtained.

Specifically, for example, the statistical analysis may identify third candidate change category items that are generated in relation to a specific user within the first time interval and include pre-change category IDs same as the third category ID. The total number of the third candidate change category items may be obtained as a fifth total amount. Further, the statistical analysis may identify fourth candidate change category items among the third candidate change category items, each of which further including a post-change category ID same as the fourth category ID. The total number of the fourth candidate change category items may be obtained as the sixth total amount. The third category ID and fourth category ID may be a pre-change category ID and a post-change category ID, respectively, contained in a change category message received from the specific user.

The second statistical analysis result may include the fifth total amount and the sixth total amount.

S107: if the second statistical analysis result meets a second rule, change the second category directory including the second correspondence to a third category directory including a third correspondence between the processing side information and the categories, and set the third category directory as a user category directory associated with the user.

The second statistical analysis result may be compared with a second rule. The second rule may be used to determine whether the second category directory and the second correspondence need to be modified.

The second rule may include one or more of the following rules:

The fifth total amount in the second statistical analysis result is larger than or equal to a fifth threshold, the fifth threshold being smaller than or equal to a total number of change category items generated within the first time interval upon change category messages received from the user; and The sixth total amount in the second statistical analysis result is larger than or equal to a sixth threshold, the sixth threshold being smaller than or equal to the fifth total amount.

If the second statistical analysis result meets the second rule, the second correspondence may be modified such that the processing side information which previously corresponds to the third category ID under the second correspondence now corresponds to the fourth category ID. Thus, a third correspondence is generated through the modification of the second correspondence. A third category directory may be generated based on the third correspondence. The third category directory may include one or more category IDs and the third correspondence between the one or more category IDs and the processing side information. The third category directory may be set as the user category directory associated with the user.

If the second statistical analysis result does not meet the second rule, no user category directory will be set for the user.

In addition to the default category directory determined by the example process flow 100 of FIG. 1, the above described example process flow 200 may determine a user category directory associated to a specific user, which further ensures that user requirements are met and classification accuracy is improved.

An illustrative example scenario of determining accounting categories may be used to further illustrate the above described methods for determining category directory.

In the illustrative scenario, it is assumed that the information of merchant "A" may include: merchant name "A", woman's clothes; the information of merchant "B" may include: merchant name "B", ceramic tiles; the information of merchant "C" may include: merchant name "C", sofas; the information of merchant "D" may include: merchant name "D", taxi cab scheduling software development company; and the information of merchant "E" may include: merchant name "E", "songs of Singer A".

Based on a first correspondence, an accounting category may be determined for each merchant. For illustrative example, merchant "A" may correspond to category "garments"; merchant "B" may correspond to category "home decoration"; merchant "C" may correspond to category "home decoration"; merchant "D" may correspond to category "transportation"; and merchant "E" may correspond to category "music" under the first correspondence. Table 1 below shows the correspondence between merchants and categories.

The accounting categories in Table 1 may be a first accounting category directory.

TABLE 1

| Merchant | Accounting category |
| --- | --- |
| A | Garment |
| B | Home Decoration |
| C | Home Decoration |
| D | Transportation |
| E | Music |

If a user is not satisfied with the accounting categories in the first accounting category directory, the user may modify the accounting category in its accounting operations. A category directory determining device may receive a message indicating that the user changed accounting category. For example, a user change category message may include: user "1", merchant "B", Jan. 1, 2014, pre-change category "home decoration", post-change category "construction materials". Based on the user change category message, a change category item may be generated. The change category item may include: "B_home decoration_construction material", "1", "20140101", wherein "B_home decoration_ construction material" may be the content of change accounting category. Similarly, multiple user change category messages may be received from this user "1" and/or other users, and correspondingly, multiple change category items will be generated.

Firstly, a statistical starting time associated with a first category ID included in a change category item may be determined. For illustrative example, in a case that the first category ID is "home decoration", the immediately previous time point when the first category ID "home decoration" is modified, for illustrative example, May 1, 2013, may be used as the statistical starting time. Assuming that the current date is Apr. 30, 2014, for illustrative example, then the first time interval may be determined as that between May 1, 2013 and Apr. 30, 2014.

Within the first time interval (May 1, 2013 to Apr. 30, 2014), for illustrative example, there are 50000 change category items which each includes a pre-change category "home decoration" (i.e., the first total amount is 50000). Among the 50000 change category items, there are 40000 user ID types (i.e., the second total amount is 40000). Among the 50000 change category items, there are 45000 change category items which each includes a post-change category "construction material" (i.e., the third total amount is 45000). Among the 45000 change category items, there are 30000 user ID types (i.e., the fourth total amount is 30000).

The assumed first rule includes: the third total amount is larger than or equal to 40000, and the fourth total amount is larger than or equal to 20000. Therefore, the above first statistical result meets the first rule.

Accordingly, the first correspondence between merchant "B" and accounting category "home decoration" is changed to a second correspondence between merchant "B" to accounting category "construction material". The second correspondence between merchants and accounting categories is shown in Table 2 below.

The accounting categories in Table 2 may be a second accounting category directory.

TABLE 2

| Merchant | Accounting category |
|---|---|
| A | Garment |
| B | Construction Material |
| C | Home Decoration |
| D | Transportation |
| E | Music |

To account for a user's specific requirements, a customized accounting category directory may be generated for the user. For example, it may be detected that a user "1" changes merchant "C"'s account category from "home decoration" to "furniture". Statistical analysis may identify change category items which are generated for user "1" within the first time interval (May 1, 2013 to Apr. 30, 2014) and include a pre-change category "home decoration". The total amount of such change category items, e.g., 1000, may be the fifth total amount. Among the 1000 change category items, 800 of them include a post-change category "furniture". So the sixth total amount is 800. The second statistical analysis result includes fifth total amount 1000 and sixth total amount 800.

The assumed second rule may include: the fifth total amount is larger than or equal to 800 and the sixth total amount is larger than or equal to 600. Therefore, the above second statistical analysis result meets the second rule. Accordingly, the correspondence between merchant "C" and accounting category "home decoration" may be changed to a correspondence between merchant "C" and accounting category "furniture". The third correspondence between merchants and accounting categories is shown in Table 3 below.

TABLE 3

| Merchant | Accounting category |
|---|---|
| A | Garment |
| B | Construction Material |
| C | Furniture |

TABLE 3-continued

| Merchant | Accounting category |
|---|---|
| D | Transportation |
| E | Music |

The accounting categories in Table 3 may be a user accounting category directory. The user accounting category directory is customized for user "1" and is used only for user "1" related accounting records.

2. Automatic Classification Methods

In the following, example of automatic classification methods will be described.

Figure 3:
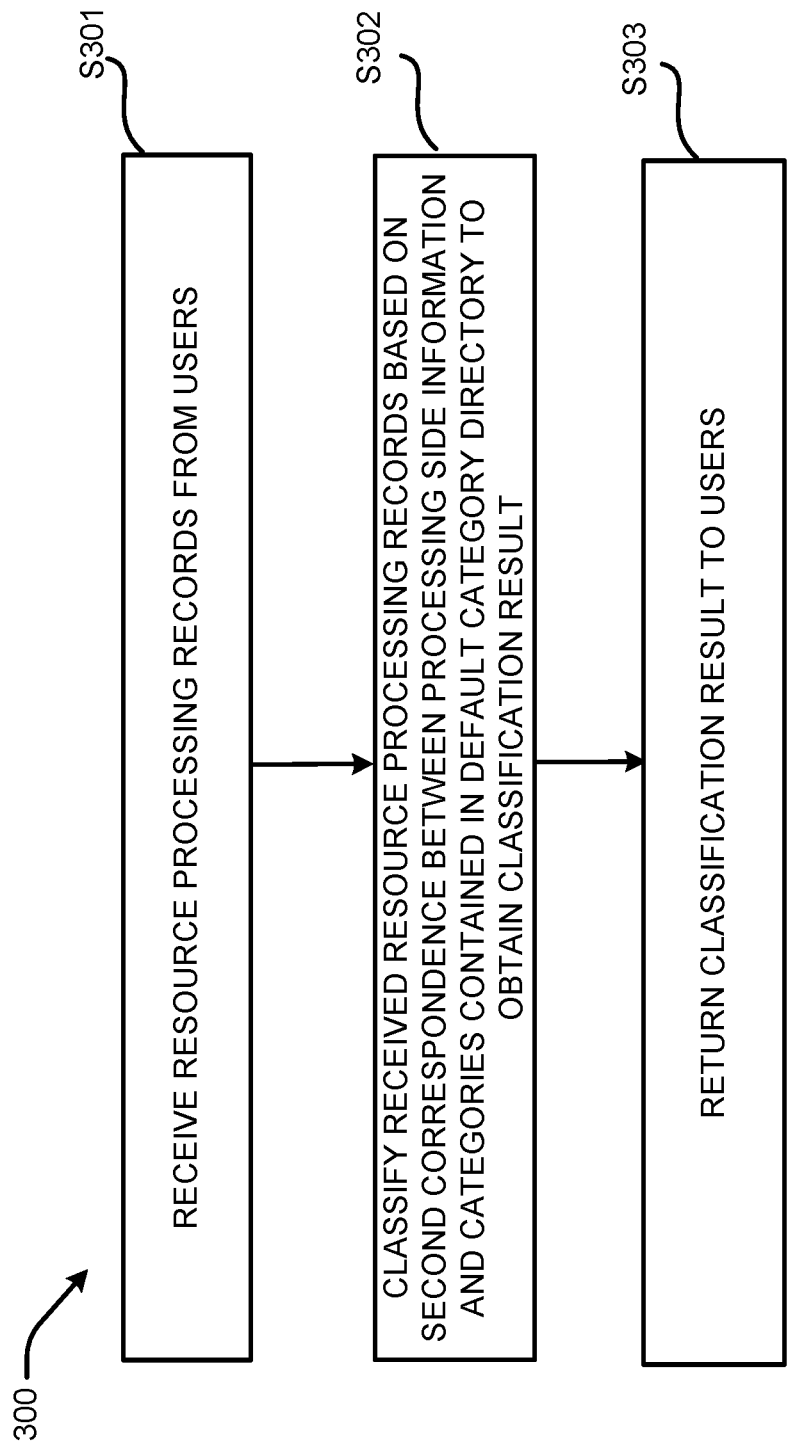
FIG. 3 illustrates a flow chart of an example of an automatic classification method.

FIG. 3 illustrates an example flow diagram 300 of an example of an automatic classification method. The class classification method shown in FIG. 3 may use a category directory determined under the example method 100 of determining category directory as shown in FIG. 1. The automatic classification method may comprise the below operations.

S301: receive resource processing records from users. Resource processing records sent from users may be received. The resource processing records may include: user ID, processing side information, amount of resources and resource processing time, and other information.

S302: classify the received resource processing records based on a second correspondence between processing side information and categories contained in the default category directory to obtain a classification result. The processing side information may be obtained from the resource processing records, and the second correspondence may be obtained using the example method 100 for determining category directory as shown in FIG. 1. Then the resource processing records may be classified based on the second correspondence between the obtain processing side information and the default category directory to obtain the classification result.

S303: return the classification result to the users.

Figure 4:
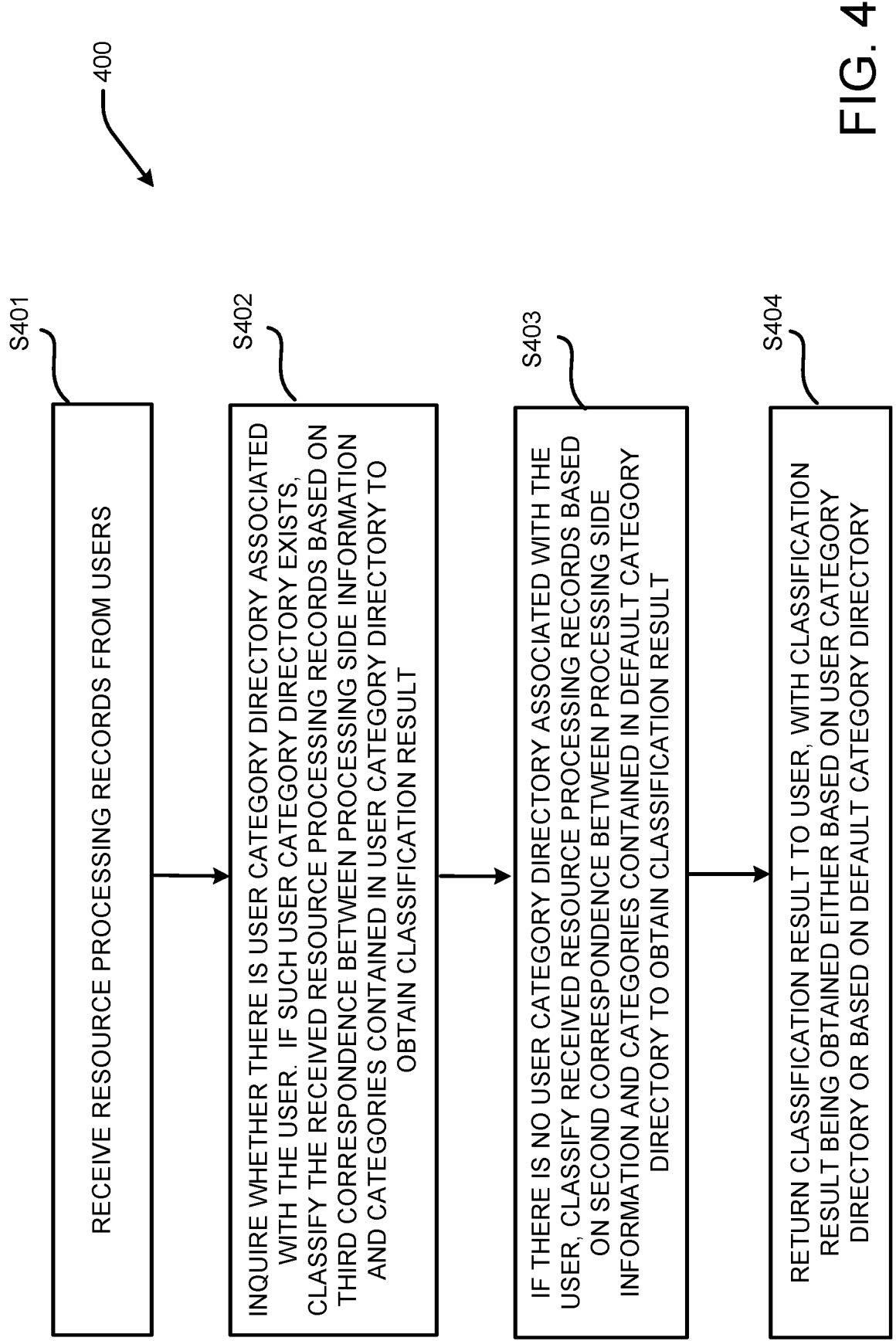
FIG. 4 illustrates a flow chart of another example of an automatic classification method.

FIG. 4 illustrates an example flow diagram 400 of another example of the automatic classification method. The automatic classification method shown in FIG. 4 may use a category directory determined under the example method 200 of determining category directory as shown in FIG. 2. The automatic classification method may comprise the below operations.

S401: receive resource processing records from a user. Resource processing records sent from users may be received. The resource processing records may include: user ID, processing side information, amount of resources and resource processing time, and other information.

S402: inquire whether there is a user category directory associated with the user. If such a user category directory exists, classify the received resource processing records based on a third correspondence between processing side information and categories contained in the user category directory to obtain a classification result. Such user category directory and the third correspondence have a priority over the default category directory in the classification.

S403: if there is no user category directory associated with the user, classify the received resource processing records based on a second correspondence between processing side information and categories contained in the default category directory to obtain a classification result.

S404: return the classification result to the user, with the classification result being obtained either based on the user category directory or based on the default category directory.

The above described example 400 of the automatic classification method corresponds to the example method 200 for determining category directory. This classification method may generate more accurate classification results and may be able to perform the classification operations using the customized user specific category directory such that the obtained classification results fit the classification requirements of a specific user.

3. Devices

Examples of a category directory determination device will be described in the following.

Figure 5:
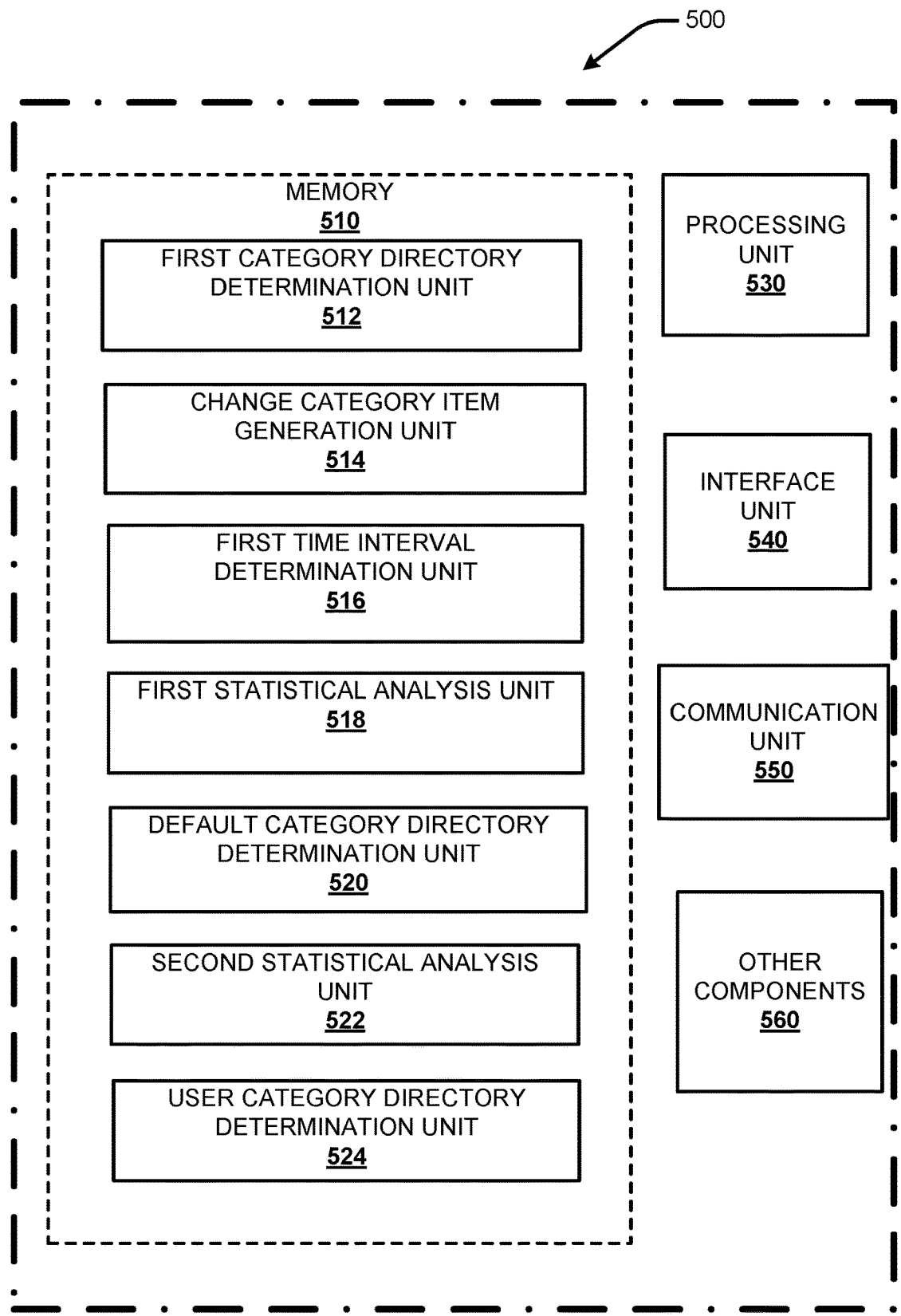
FIG. 5 illustrates a block diagram of an example of a device for determining category directory.

FIG. 5 illustrates a block diagram of an example of a category directory determination device. As shown in FIG. 5, category directory determination device 500 may include a memory 510 which stores computer executable instructions, which when executed by a processor, configure the processor and the related computer device to implement a first category directory determination unit 512, a change category item generation unit 514, a first time interval determination unit 516, a first statistical analysis unit 518 and a default category directory determination unit 520. In addition, the category directory determination device also includes one or more processing unit 530, interface unit 540, communication unit 550 and other components 560. Units/components of the category directory determination device may reside in a single computing machine or may reside in different devices coupled together through communication networks to achieved the relevant functions in a distributed computing environment.

The first category directory determination unit 512 is operable to determine a first category directory based on processing side information of resource processing records and a first correspondence between the processing side information and categories.

The change category item generation unit 514 is operable to receive a change category message from a user, and to generate a change category item including a content of the change category message.

The first time interval determination unit 516 is operable to determine a statistical starting time associated with a first category ID included in the change category item, and to determine a first time interval associated with the first category ID based on the statistical starting time.

The first statistical analysis unit 518 is operable to statistically analyze change category items that are generated within the first time interval and include the first category ID to obtain a first statistical analysis result.

The default category directory determination unit 520 is operable to, if the first statistical analysis result meets a first rule, change the first category directory including the first correspondence to a second category directory including a second correspondence between the processing side information and the categories, and set the second category directory as the default category directory; and if the first statistical result does not meet the first rule, set the first category directory as the default category directory.

Further, the category directory determination device may also comprise a second statistical analysis unit 522 and a user category directory determination unit 524.

The second statistical analysis unit 522 is operable to statistically analyze change category items which are generated in relation to a user within the first time interval and include a third category ID to obtain a second statistical result.

The user category directory determination unit 524 is operable to, if the second statistical analysis result meets a second rule, change a second category directory including a second correspondence to a third category directory including a third correspondence. The third category directory may be set as the user category directory for the user.

The above category directory determination devices may be associated with the examples of the methods for determining category directory to implement the methods for determining category directory and achieve the desired technical effects.

Figure 6:
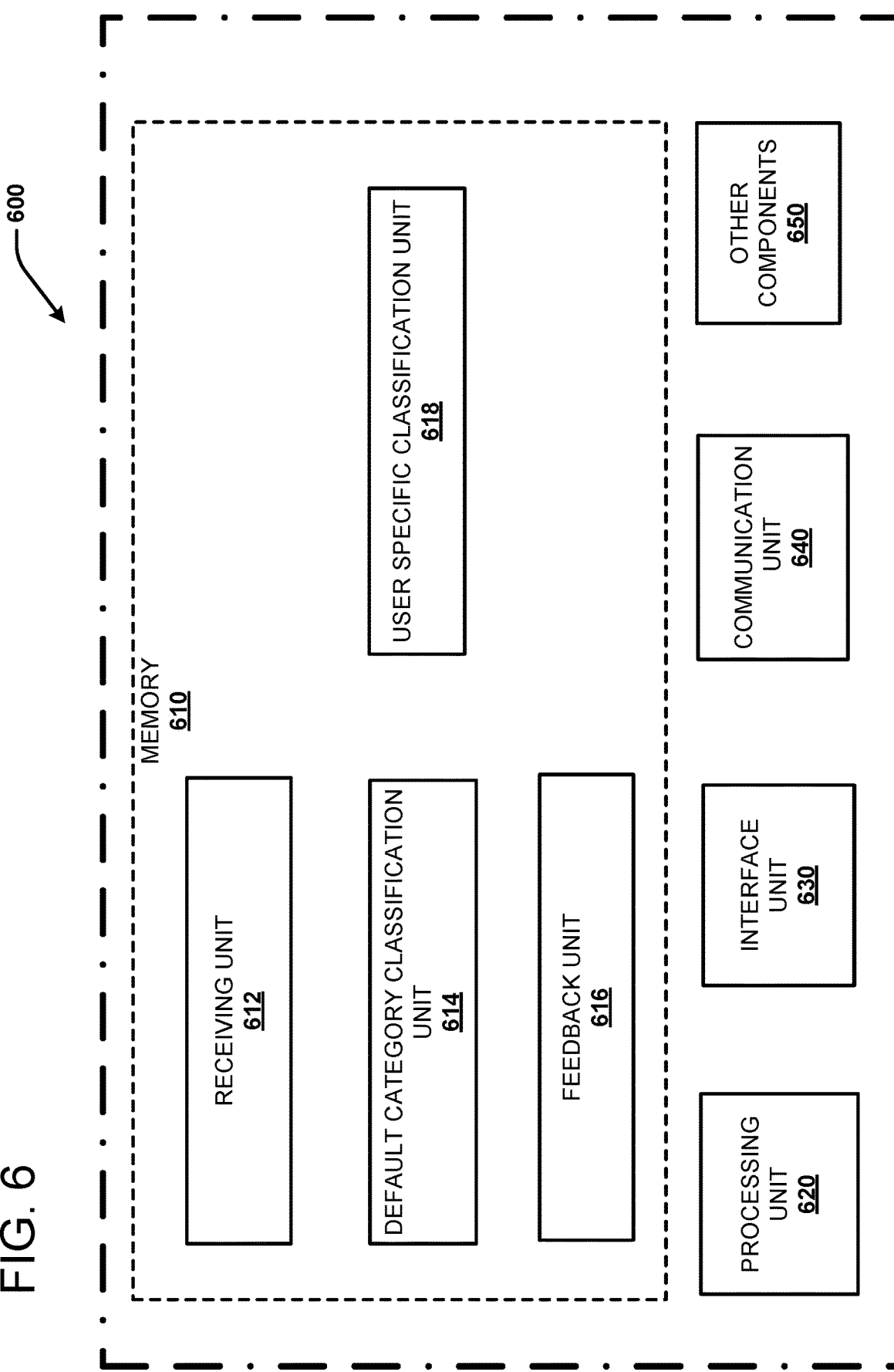
FIG. 6 illustrates a block diagram of an example of an automatic classification device.

FIG. 6 illustrates a block diagram of examples of an automatic classification device 600. As shown in FIG. 6, the automatic classification device 600 may include a memory 610 which stores computer executable instructions, which when executed by a processor, configure the processor and the related computer device to implement receiving unit 612, a default category classification unit 614, a feedback unit 616 and a user specific classification unit 618. The automatic classification device also includes one or more processing unit 620, interface unit 630, communication unit 640, and other components 650. Units/components of the automatic classification device may reside in a single computing machine or may reside in different devices coupled together through communication networks to achieved the relevant functions in a distributed computing environment.

The receiving unit 612 is operable to receive resource processing records from users.

The default category classification unit 614 is operable to classify the resource processing records using the second correspondence between the processing side information and the categories included in the default category directory to obtain a classification result.

The feedback unit 616 is operable to return the classification result to the users.

Further operations may involve the user specific classification unit 618.

The user specific classification unit 618 is operable to inquire whether there is a user category directory associated with the user of the received resource processing records. If such a user category directory exists, the user specific classification unit 618 will classify the received resource processing records based on a third correspondence between processing side information and categories contained in the user category directory to obtain a classification result. The classification result will be returned to the user through feedback unit 616. If there is no such user category directory associated with the user, the user specific classification unit 618 will transfer to the default category classification unit 614 to operate the classification.

The examples of the automatic classification devices disclosed above may be associated with the example of the automatic classification methods in implementing the automatic classification methods to achieve the expected technical effects.

4. Systems and Components

In the 1990s, improvements in a technique may be clearly differentiated between either an improvement in hardware (e.g., improvements in circuit designs such as diodes, transistors, switches, etc.) or an improvement in software (e.g., improved process flows). However, with technology development, nowadays, the improvements of many method processes have been viewed as direct improvements of the hardware circuit structure. Designers almost always embed the improved method process flows into the hardware circuits to obtain the corresponding hardware circuit structures. Hence, it is groundless to hold that an improvement in process flow cannot be achieved in hardware modules. For example, a Programmable Logic Device (PLD), e.g., a Field Programmable Gate Array (FPGA), is an integrated circuit whose logic functions are determined by a user through programming. A designer programs the PLD to integrate a digital system onto the PLD, without engaging a chip manufacturer to design and manufacture dedicated integrated circuit chips. Moreover, such "programming a chip" may be achieved through a logic compiler software similar to the software compiler used in software development. The original code before compilation may be written in a specific programming language, which is called hardware description language (HDL). HDLs include, but not limited to, Advanced Boolean Expression Language ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently commonly used HDLs include Very-High-Speed Integrated Circuit Hardware Description Language (VHDL) and Verilog2. It should be clearly understood by those skilled in the art that by programming/embedding the logic process flow onto an integrated circuit using some hardware description languages described above, the hardware circuit may be able to implement the logic process flow.

A controller may be implemented in any suitable manner. For example, a controller may be implemented through a microprocessor or processor and instructions executable by the microprocessor/processor stored in a computer readable medium, logic gates, switches, disclosure specific integrated circuits (ASIC), programmable logic controllers and embedded microcontrollers. Examples of controllers include, but are not limited to, ARC 625D, Atmel AT9SAM, Microchip PIC18F26K20 and Silicon Labs C8051F320. A memory controller may also be implemented as part of control logic of the memory.

Those skilled in the art will also appreciate that in addition to implementing the controller in a pure computer readable program code manner, the controller may be implemented through programming logic process flows into logic gates, switches, a special integrated circuit, a programmable logic controller, and/or an embedded microcontroller. Such a controller may therefore be considered as a hardware component and the units thereof may be considered structures of the hardware components. Further, such units may be considered both as software module and as hardware structures to achieve the functions.

The system, device, module, or unit described herein above may be implemented by a computer chip or system or by a product with certain functions.

For convenience of description, the above devices are described as various units in terms of functions. Of course, one or more of the functions of the units may be implemented together in one or more software and/or hardware elements when implementing the present disclosure.

It will be apparent to those skilled in the art that the present disclosure can be implemented by software and necessary universal hardware platforms. Based on this understanding, the technical solutions of the present disclosure essentially, or the technology advancement contributions made to the technology, can be embodied in the form of a software product. In a typical configuration, a computing device includes one or more processors (CPU), an input/output interface, a network interface, and a memory. The software product may include certain instructions to enable/configure a computing device (which may be a personal computer, a server, or a network device) to implement the methods or some portions of the methods described in the examples of the present disclosure. The computer software product can be stored in a memory. The memory may include computer readable medium including volatile memory, random access memory (RAM) and/or non-volatile memory, such as read-only memory (ROM) or flash RAM. Memory is an example of computer storage/computer readable medium which includes removable and non-removable media, and may be implemented by any method or technology of information storage. The information may be a computer readable instruction, a data structure, a program module, or other data. Examples of storage medium of a computer include, but are not limited to, phase change memory (PCM), static random access memory (SRAM), dynamic random access memory (DRAM), and other types of random access memory (RAM), read-only memory (ROM), read-only memory (ROM), read-only memory (ROM), electrically erasable programmable read-only memory (EEPROM); flash memory or other memory technology, compact disc read-only memory (CD-ROM), digital versatile disks (DVD) and other optical storage, magnetic cassettes, magnetic tape/magnetic disk storage or other magnetic storage devices, or any other non-transmission medium that can be used for storing information which can be accessed by a computing device. As defined herein, a computer storage/readable medium does not include transitory computer readable media such as modulated data signals and carriers.

Various examples in the specification are described in a progressive manner. If there are similarities among different examples, references could be made among such examples for appreciation. Differences among examples may be described. For example, regarding system examples, reference may be made to the method examples to appreciate the disclosure.

The present disclosure may be used in numerous general-purpose or special-purpose computer system environments or configurations, such as a personal computer (PC), a server, a handheld device or a portable device, a tablet-type device, a multi-processor system, a microprocessor based system, a set top box, a programmable consumer electronic device, a network PC, a minicomputer, a mainframe computers, and a distributed computing environment that may include any of the above computing systems or devices, and the like.

The present disclosure may be described in the general context of computer-executable instructions executed by a computer, such as program modules. Generally, program modules include routines, programs, objects, components, data structures, and so on, which can perform tasks and/or implement data types. The disclosure can also be implemented in distributed computing environments. In distributed computing environments, tasks are performed by a remote processing device connected through a communication network. In a distributed computing environment, program modules may be located in local and/or remote computer storage media including storage devices.

Although the present disclosure is described by way of some examples, those skilled in the art understand that other variants exist without departing from the kernels and scope of the present disclosure, and expect that the appended claims cover such variants and modifications without departing from the kernel and scope of the present disclosure.

The disclosure may be understood with the following clauses:

Clause 1: a method for determining a category directory, characterized by comprising: determining a first category directory based on processing side information of resource processing records and a first correspondence between the processing side information and categories; receiving a change category message from a user, and generating a change category item including a change category content indicating the user changing a first category with a first category ID to a second category with a second category ID; determining a statistical starting time associated with the first category ID included in the change category item, and determining a first time interval associated with the first category ID based on the statistical starting time; statistically analyzing change category items that are generated within the first time interval and include the first category ID to obtain a first statistical analysis result; if the first statistical analysis result meets a first rule, modifying the first category directory including the first correspondence to obtain a second category directory including a second correspondence between the processing side information and categories, and setting the second category directory as a default category directory; and if the first statistical analysis result does not meet the first rule, setting the first category directory as a default category directory.

Clause 2: the method of clause 1, characterized in that the first correspondence between the processing side information and the categories is determined based on analyzing the processing side information, including a processing party associated with the processing side information, a characteristic of the processing party, or a keyword contained in the processing side information.

Clause 3: the method of clause 1, characterized in that the first correspondence includes one or more processing side information corresponding to a category.

Clause 4: the method of clause 1, characterized in that the category directory comprises category IDs of one or more categories, category names associated with the category IDs, and the first correspondence between the processing side information and the one or more categories.

Clause 5: the method of clause 1, characterized in that the change category message includes user ID, processing side information of an associated resource processing record, a time of a change category event, a pre-change category ID and a post-change category ID.

Clause 6: the method of clause 1, characterized in that the change category items each include a change category content, a user ID and a time of a change category event, wherein the change category content includes processing side information of an associated resource processing record, a pre-change category ID and a post-change category ID.

Clause 7: the method of clause 1, characterized in that the statistically analyzing the change category items that are generated within the first time interval and include the first category ID comprises: statistically analyzing a first total amount of first candidate change category items, the first candidate change category items each including a pre-change category ID same as the first category ID; statistically analyzing a second total amount of user ID types associated with the first candidate change category items; statistically analyzing a third total amount of second candidate change category items, the second candidate change category items each including a post-change category ID same as the second category ID; and statistically analyzing a fourth total amount of user ID types associated with the second candidate change category items.

Clause 8: the method of clause 7, characterized in that the first statistical analysis result includes the first total amount, the second total amount, the third total amount and the fourth total amount.

Clause 9: the method of clause 7, characterized in that the first rule comprises at least one of the below: the first total amount is larger than or equal to a first threshold, the first threshold being smaller than or equal to a total number of change category items generated within the first time interval; the second total amount is larger than or equal to a second threshold, the second threshold being smaller than or equal to a total number of user ID types in the change category items generated within the first time interval, and the second threshold being smaller than or equal to the first total amount; the third total amount is larger than or equal to a third threshold, the third threshold being smaller than or equal to the first total amount; and the fourth total amount is larger than or equal to a fourth threshold, the fourth threshold being smaller than or equal to the third total amount.

Clause 10: the method of clause 1, characterized by further comprising: statistically analyzing change category items that are generated within the first time interval in relation to a user and include a third category ID to obtain a second statistical analysis result; and if the second statistical analysis result meets a second rule, modifying the second category directory including the second correspondence to obtain a third category directory including a third correspondence between the processing side information and the categories, and setting the third category directory as a user category directory for the user.

Clause 11: the method of clause 10, characterized in that the statistically analyzing the category items that are generated within the first time interval in relation to the user and include the third category ID comprises: statistically analyzing a fifth total amount of third candidate change category items, the third candidate change category items each including a pre-change category ID same as the third category ID; and statistically analyzing a sixth total amount of fourth candidate change category items, the fourth candidate change category items each being among the third candidate change category items and including an post-change category ID same as a fourth category ID.

Clause 12: the method of clause 11, characterized in that the second statistical analysis result includes the fifth total amount and the sixth total amount.

Clause 13: the method of clause 11, characterized in that the second rule comprises at least one of: the fifth total amount is larger than or equal to a fifth threshold, the fifth threshold being smaller than or equal to a total number of change category items generated within the first time interval in relation to the user; and the sixth total amount in the second statistical analysis result is larger than or equal to a sixth threshold, the sixth threshold being smaller than or equal to the fifth total amount.

Clause 14: an automatic classification method, characterized by classifying using a category directory determined by a category determination method, comprising: receiving a resource processing record from a user; classifying the received resource processing record based on a second correspondence between processing side information and categories in a default category directory; and returning a result of the classifying to the user.

Clause 15: the automatic classification method of clause 14, characterized by, upon the receiving the resource processing record from the user, further comprising: inquiring whether there is a user category directory associated with the user; if there is a user category directory associated with the user, classifying the received resource processing record based on a third correspondence between the processing side information and categories contained in the user category directory to obtain a classification result, if there is no user category directory associated with the user, classifying the received resource processing record based on a second correspondence between the processing side information and categories contained in a default user category directory to obtain a classification result.

Clause 16: a category directory determination device, characterized by comprising: a first category directory determination unit, a change category item generation unit, a first time interval determination unit, a first statistical analysis unit and a default category directory determination unit, wherein, the first category directory determination unit is operable to determine a first category directory based on processing side information of resource processing records and a first correspondence between the processing side information and categories; the change category item generation unit is operable to receive a change category message from a user, and to generate a change category item including a change category content indicating changing a first category with a first category ID to a second category with a second category ID; the first time interval determination unit is operable to determine a statistical starting time associated with the first category ID included in the change category item, and to determine a first time interval associated with the first category ID based on the statistical starting time; the first statistical analysis unit is operable to statistically analyze change category items that are generated within the first time interval and include the first category ID to obtain a first statistical analysis result; and the default category directory determination unit is operable to, if the first statistical analysis result meets a first rule, change the first category directory including the first correspondence to a second category directory including a second correspondence between the processing side information and categories, and set the second category directory as a default category directory, and if the first statistical result does not meet the first rule, set the first category directory as a default category directory.

Clause 17: the category directory determination device of clause 16, characterized by further comprising a second statistical analysis unit and a user category directory determination unit, wherein, the second statistical analysis unit is operable to statistically analyze change category items that are generated within the first time interval in relation to a user and include a third category ID to obtain a second statistical analysis result; and the user category directory determination unit is operable to, if the second statistical analysis result meets a second rule, change the second category directory including the second correspondence to obtain a third category directory including a third correspondence between the processing side information and categories, and set the third category directory as a user category directory for the user.

Clause 18: an automatic classification device, characterized by comprising: a receiving unit, a default category classification unit and a feedback unit, wherein, the receiving unit is operable to receive a resource processing record from a user, the default category classification unit is operable to classify the resource processing record using a second correspondence between processing side information and categories included in a default category directory to obtain a classification result, and the feedback unit is operable to return the classification result to the user.

Clause 19: the automatic classification device of clause 18, characterized by further comprising a user specific classification unit, wherein the user specific classification unit is operable to: inquire whether there is a user category directory associated with the user from which the resource processing record is received, and if there is a user category directory associated with the user, classify the received resource processing record based on a third correspondence between processing side information and categories contained in the user category directory to obtain a classification result, and feedback the classification result to the user, and if there is no user category directory associated with the user, transfer to the default category classification unit to classify the received resource processing record.

What is claimed is:

1. A device, comprising:
one or more processors;
memory;
a first category directory determination unit, a change category item generation unit, a first time interval determination unit, a first statistical analysis unit, and a second statistical analysis unit that are stored in the memory and executable by the one or more processors, wherein,
the first category directory determination unit is operable to determine a first category directory based on processing side information of resource processing records and a first correspondence between the processing side information and categories, the categories including at least a first category;
the change category item generation unit is operable to receive a change category message from a first user, and to generate a change category item including a change category content indicating changing the first category with a first category ID to a second category with a second category ID;
the first time interval determination unit is operable to determine a statistical starting time associated with the first category ID included in the change category item, and to determine a first time interval associated with the first category ID based on the statistical starting time;
the first statistical analysis unit is operable to statistically analyze change category items that are generated within the first time interval and include the first category ID to obtain a first statistical analysis result; and
the second statistical analysis unit is operable to statistically analyze change category items that are generated within the first time interval in relation to the first user and include a third category ID to obtain a second statistical analysis result, wherein:
the first category directory is set as a default category directory for the first user and one or more other users without changing the first category to the second category if the first statistical analysis result does not meet a first rule and the second statistical analysis result does not meet a second rule, the second rule being different from the first rule,
a second category directory having the first category being changed to the second category is set as the default category directory for the first user and the one or more other users if the first statistical analysis result meets the first rule, and
a user category directory having the first category being changed to the second category is set as a category directory specific for the first user if the first statistical analysis result does not meet a first rule and the second statistical analysis result meets the second rule.

2. The device of claim 1, further comprising a default category directory determination unit and a user category directory determination unit that are stored in the memory and executable by the one or more processors, wherein, the default category directory determination unit is operable to, if the first statistical analysis result meets the first rule, change the first category directory including the first correspondence to a second category directory including a second correspondence between the processing side information and categories, and set the second category directory as the default category directory, and if the first statistical result does not meet the first rule, set the first category directory as the default category directory; and the user category directory determination unit is operable to, if the second statistical analysis result meets the second rule, change the second category directory including the second correspondence to obtain a third category directory including a third correspondence between the processing side information and categories, and set the third category directory as the user category directory for the first user.

3. The device of claim 1, further comprising: a receiving unit, a default category classification unit and a feedback unit that are stored in the memory and executable by the one or more processors, wherein, the receiving unit is operable to receive a resource processing record from a second user, the default category classification unit is operable to classify the resource processing record using the default category directory to obtain a classification result, and the feedback unit is operable to return the classification result to the second user.

4. The device of claim 3, further comprising a user specific classification unit that is stored in the memory and executable by the one or more processors, wherein the user specific classification unit is operable to:

inquire whether a user category directory associated with the second user from which the resource processing record is received exists, and if the user category directory associated with the second user exists, classify the received resource processing record based on the user category directory associated with the second user to obtain a classification result, if no user category directory associated with the second user, transfer to the default category classification unit to classify the received resource processing record.

5. A method comprising:

providing a first category directory including a first correspondence between a processing side information and a first category;

generating a target change category item including a content indicating changing the first category to a second category, upon noticing a first user's desire of change;

obtaining a first time interval;

analyzing all previous change category items generated within the first time interval and including the first category to obtain a first analysis result;

analyzing change category items that are generated within the first time interval in relation to the first user and include a third category ID to obtain a second analysis result;

if the first analysis result meets a first rule, modifying the first category directory including the first correspondence to obtain a second category directory including a second correspondence between the processing side information and the second category, and setting the second category directory as a default category directory for the first user and one or more other users;

if the first statistical analysis result does not meet the first rule and the second analysis result meets a second rule, modifying the second category directory including the second correspondence to obtain a third category directory as a user category directory specific for the first user, wherein the second rule is different from the first rule; and if the first statistical analysis result does not meet the first rule and the second analysis result meets the second rule, setting the first category directory as the default category directory for the first user and the one or more other users.

6. The method of claim 5, wherein the first correspondence between the processing side information and the first category is determined based on analyzing the processing side information, including at least one of a processing party associated with the processing side information, a characteristic of the processing party, and a keyword contained in the processing side information.

7. The method of claim 5, wherein the first correspondence includes one or more processing side information corresponding to the first category.

8. The method of claim 5, wherein the target change category message further includes a user ID, the processing side information, a time of a change category event.

9. The method of claim 5, wherein the previous change category items each include a change category content, a user ID, a time of a change category event, a pre-change category ID and a post-change category ID.

10. The method of claim 5, wherein the analyzing the change category items that are generated within the first time interval and include the first category ID comprises:

identifying a first total amount of first candidate change category items, the first candidate change category items each including a pre-change category ID of the first category;

identifying a second total amount of user ID types associated with the first candidate change category items;

identifying a third total amount of second candidate change category items, the second candidate change category items each including a post-change category ID of the second category; and identifying a fourth total amount of user ID types associated with the second candidate change category items.

11. The method of claim 10, wherein the first statistical analysis result includes the first total amount, the second total amount, the third total amount and the fourth total amount.

12. The method of claim 10, wherein the first rule comprises at least one of:

the first total amount is larger than or equal to a first threshold, the first threshold being smaller than or equal to a total number of change category items generated within the first time interval;

the second total amount is larger than or equal to a second threshold, the second threshold being smaller than or equal to a total number of user ID types in the change category items generated within the first time interval, and the second threshold being smaller than or equal to the first total amount;

the third total amount is larger than or equal to a third threshold, the third threshold being smaller than or equal to the first total amount; and the fourth total amount is larger than or equal to a fourth threshold, the fourth threshold being smaller than or equal to the third total amount.

13. The method of claim 5, wherein the analyzing the category items that are generated within the first time interval in relation to the user and include the third category ID comprises:
- identifying a fifth total amount of third candidate change category items, the third candidate change category items each including a pre-change category ID same as the third category ID; and
- identifying a sixth total amount of fourth candidate change category items, the fourth candidate change category items each being among the third candidate change category items and including a post-change category ID same as a fourth category ID.

14. The method of claim 13, wherein the second analysis result includes the fifth total amount and the sixth total amount.

15. The method of claim 13, wherein the second rule comprises at least one of:
- the fifth total amount is larger than or equal to a fifth threshold, the fifth threshold being smaller than or equal to a total number of change category items generated within the first time interval in relation to the first user; and
- the sixth total amount in the second analysis result is larger than or equal to a sixth threshold, the sixth threshold being smaller than or equal to the fifth total amount.

16. The method of claim 5, further comprising:
- receiving a resource processing record from a second user;
- classifying the received resource processing record based on the default category directory; and
- returning a result of the classifying to the second user.

17. The method of claim 16, further comprising:
- inquiring whether a user category directory associated with the second user exists;
- if the user category directory associated with the second user exists, classifying the received resource processing record based the user category directory associated with the second user to obtain a first classification result; and
- if no user category directory associated with the second user exists, classifying the received resource processing record based on the default category directory to obtain a second classification result.

18. One or more computer readable media storing executable instructions that, when executed by one or more processors, cause the one or more processors to perform acts comprising:
- providing a first category directory including a first correspondence between a processing side information and a first category;
- generating a target change category item including a content indicating changing the first category to a second category, upon noticing a desire of change by a user;
- analyzing all previous change category items generated within a time interval in relation to the user and including the first category as a pre-change category to obtain a first analysis result;
- analyzing change category items that are generated within the time interval in relation to the user and include a third category ID to obtain a second analysis result;
- if the first analysis result meets a first rule, modifying the first category directory including the first correspondence to obtain a second category directory including a second correspondence between the processing side information and the second category as a default category directory for the first user and one or more other users;
- if the first statistical analysis result does not meet the first rule and the second analysis result meets a second rule, modifying the second category directory including the second correspondence to obtain a third category directory as a user category directory specific for the user, wherein the second rule is different from the first rule; and
- if the first statistical analysis result does not meet the first rule and the second analysis result meets the second rule, setting the first category directory as the default category directory for the user and the one or more other users.

19. The one or more computer readable media of claim 18, wherein the analyzing all previous change category items generated within the time interval in relation to the user and including the first category as a pre-change category includes:
- obtaining a fifth total amount of a first candidate change category items, the first candidate change category items each including a pre-change category ID of the first category; and
- obtaining a sixth total amount of second candidate change category items, the second candidate change category items each being among the first candidate change category items and including a post-change category ID of the second category.

* * * * *